(12) United States Patent
Gokhale (10) Patent No.: US 8,223,844 B2
(45) Date of Patent: Jul. 17, 2012

(54) HIGH FREQUENCY EMPHASIS IN DECODING OF ENCODED SIGNALS

(75) Inventor: Neelesh N. Gokhale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 1541 days.

(21) Appl. No.: 10/988,873

(22) Filed: Nov. 15, 2004

(65) Prior Publication Data

US 2005/0105622 A1 May 19, 2005

Related U.S. Application Data

(60) Provisional application No. 60/520,163, filed on Nov. 14, 2003.

(51) Int. Cl.
*H04B 1/66* (2006.01)
*H04N 7/12* (2006.01)
(52) U.S. Cl. ............................. 375/240.22; 375/240.03
(58) Field of Classification Search ............... 375/240.03
See application file for complete search history.

(56) References Cited

U.S. PATENT DOCUMENTS

| | | | | |
|---|---|---|---|---|
| 5,243,428 A * | 9/1993 | Challapali et al. | ............ | 348/607 |
| 5,369,439 A * | 11/1994 | Matsuda et al. | ............ | 375/240.2 |
| 5,455,629 A * | 10/1995 | Sun et al. | ................ | 375/240.27 |
| 6,002,801 A * | 12/1999 | Strongin et al. | ............. | 382/233 |
| 6,175,650 B1 * | 1/2001 | Sindhu et al. | ................ | 382/171 |
| 7,079,697 B2 * | 7/2006 | Zhou | ............................. | 382/250 |
| 2003/0026478 A1 * | 2/2003 | Jones et al. | .................. | 382/170 |
| 2003/0099292 A1 * | 5/2003 | Wang et al. | ............. | 375/240.12 |
| 2005/0074062 A1 * | 4/2005 | Sung et al. | ................ | 375/240.2 |
| 2008/0037631 A1 * | 2/2008 | Hong | ...................... | 375/240.03 |

* cited by examiner

*Primary Examiner* — Jay Patel
*Assistant Examiner* — Jessica Prince
(74) *Attorney, Agent, or Firm* — ÆON Law; Adam L. K. Philipp (57) ABSTRACT

A decoder adapted to generate an intermediate decoded version of a video frame from an encoded version of the video frame, determine either an amount of high frequency basis functions or coefficients below a quantization threshold for at least one block of the video frame, and generate a final decoded version of the video frame based at least in part on the intermediate decoded version of the video frame and the determined amount(s) for the one or more blocks of the video frame, is disclosed. In various embodiments, the decoder may be incorporated as a part of a video system.

19 Claims, 10 Drawing Sheets

|     |     |     |     |
| --- | --- | --- | --- |
| C₀  | C₁  | C₅  | C₆  |
| C₂  | C₄  | C₇  | C₁₂ |
| C₃  | C₈  | C₁₁ | C₁₃ |
| C₉  | C₁₀ | C₁₄ | C₁₅ |

*Fig.4a*

|    |    |    |    |
|----|----|----|----|
| 2  | 1  | -1 | -2 |
| 1  | 0  | 0  | -1 |
| -1 | 0  | 0  | 1  |
| -2 | -1 | 1  | 2  |

HIGH FREQUENCY EMPHASIS IN DECODING OF ENCODED SIGNALS

RELATED APPLICATION

This application is a non-provisional application of provisional application 60/520,163, filed on Nov. 14, 2003, entitled "High Frequency Emphasis in Coding Signals"; claims priority to said '163 provisional application, and incorporates its specification in entirety by reference.

FIELD OF THE INVENTION

The present invention relates to the field of encoding and decoding of digital signals. More specifically, the present invention is related to video and image coding/decoding.

BACKGROUND OF THE INVENTION

Advances in microprocessor and video related technologies have led to wide spread deployment and adoption of numerous types of audio, video and imaging devices. Examples of such devices include but are not limited to digital cameras, camcorders, MP3 players, digital versatile disk (DVD) players, video enabled laptop and desktop computing devices as well as servers, and so forth.

Advances in networking, telecommunication, satellite and other related technologies have also led to increase in on demand and/or real time online delivery of audio and video information, including delivery over public networks, such as the Internet.

Whether videos are delivered offline (e.g. from a DVD player) or online (e.g. from a video server), high quality audio or video inherently requires a high volume of data. Thus, audio and video delivery and rendering often involve encoding and decoding to reduce the amount of data to be stored, retrieved and/or transmitted.

Additionally, Video Codecs employing schemes like Deblocking Filter and B-Frames have a tendency to attenuate certain spectral information in the video. For example, Deblocking Filter can smoothen out certain frequencies and B-Frame skipped mode can hurt the high frequencies present in Video. Also small transform sizes and/or high quantizers may not be able to capture certain spectral information during video coding.

DETAILED DESCRIPTION OF EMBODIMENTS OF THE INVENTION

Embodiments of the present invention includes a video decoder, devices equipped with these decoders, systems made up of such devices, and methods of operations of these elements, devices and systems, and related subject matters.

Figure 1:
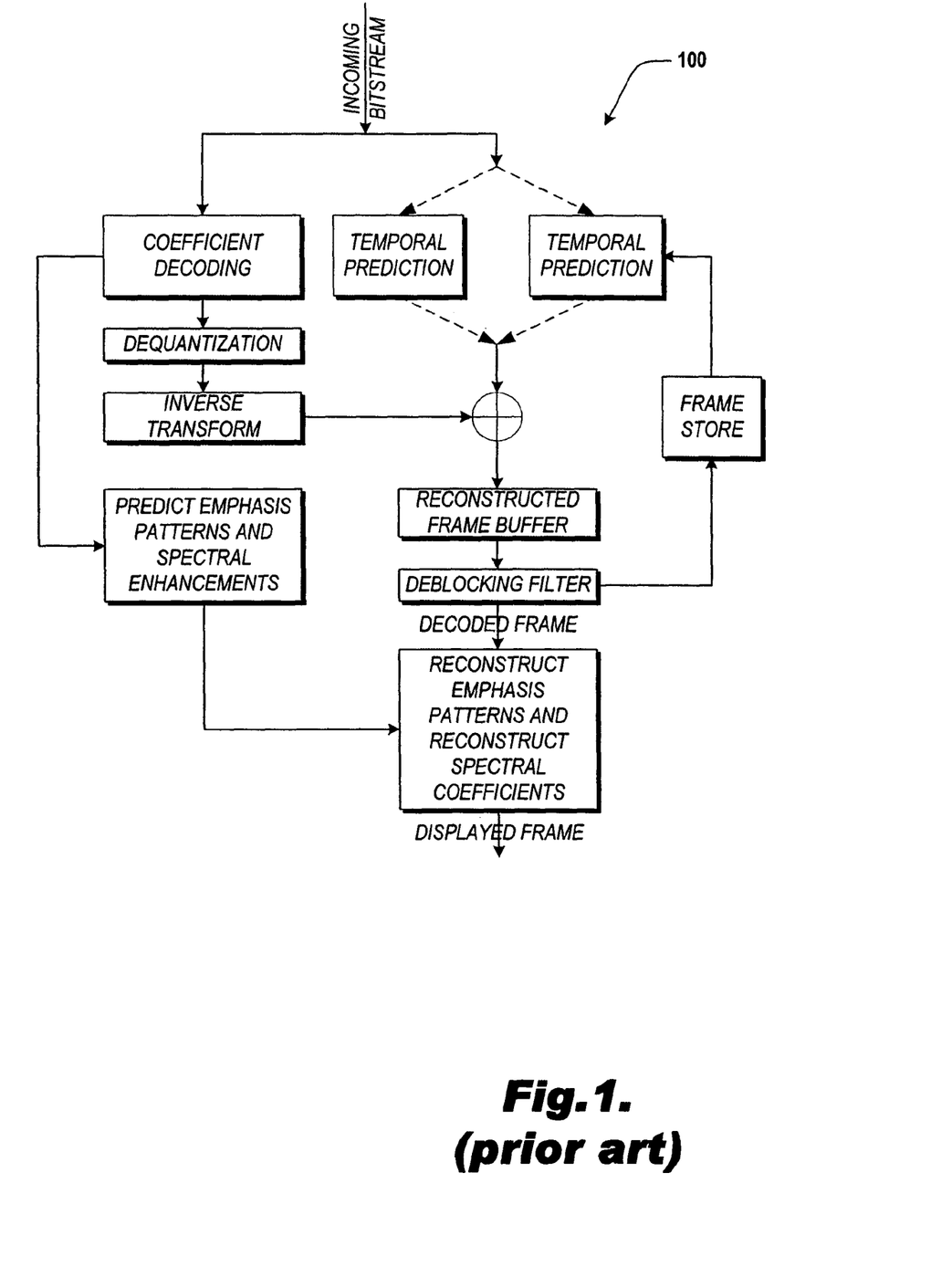
FIG. 1 illustrates a block diagram of a prior art video processing system.

A prior art video processing system 100 is illustrated in FIG. 1. More specifically, the decoding section of video processing system 100 is illustrated. For the illustrated embodiment, Video Codecs employ schemes like Deblocking Filter and B-Frames. As will be appreciated by those skilled in the art, Video Codecs have a tendency to attenuate certain spectral information in the video. For example Deblocking filter can smoothen out certain frequencies and B-Frame skipped mode can hurt the high frequencies present in Video.

Additionally, as typical of conventional Video Codecs, its inverse transformation and dequantization units operate with small transform sizes and/or high quantizers. Thus, Video Codecs may not be able to capture certain spectral information during video coding.

The terms Video Codecs, Deblocking Filter, B-Frame, B-Frame skipped mode, transformation, quantizers, high frequency, I-Frame, P-Frame, quantization parameters, basis function, and so forth, are all used in this specification in accordance with their plain meaning as understood by those of ordinary skill in the art of video signal processing, in particular, consistent with the meaning of these terms as they are used in ITU video signal processing standards. [ITU=International Telecommunication Union.]

However, as will be described in more detail below, in various embodiments of the present invention, High Frequency Emphasis (HFE) is employed to correct and further enhance the recovered video. HFE adds back spectral information lost or attenuated in video coding. More specifically, in various embodiments, HFE is implemented as a post filter which, Adds a calculated amount of certain high frequency basis function actually transmitted in the bitstream with the video frames.

Adds a calculated amount of high frequency basis functions predicted from coefficients transmitted in the current block or the past or future frame.

Figure 2A:
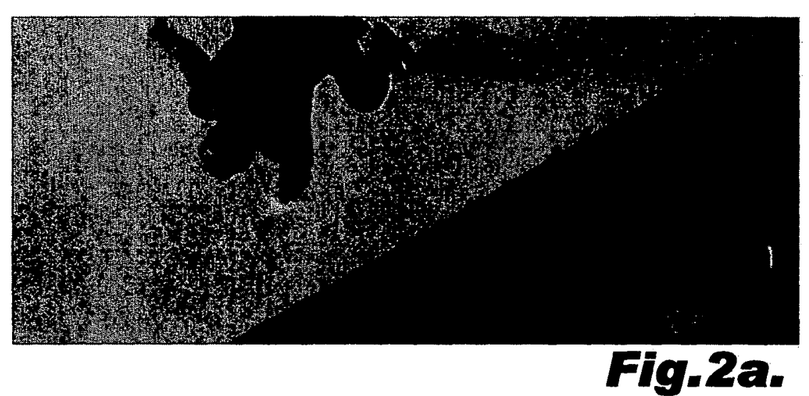
FIG. 2a illustrates a frame image without the High Frequency Emphasis (HFE) enhancements.

FIG. 2a illustrates a frame image without the HFE enhancements.

Figure 2B:
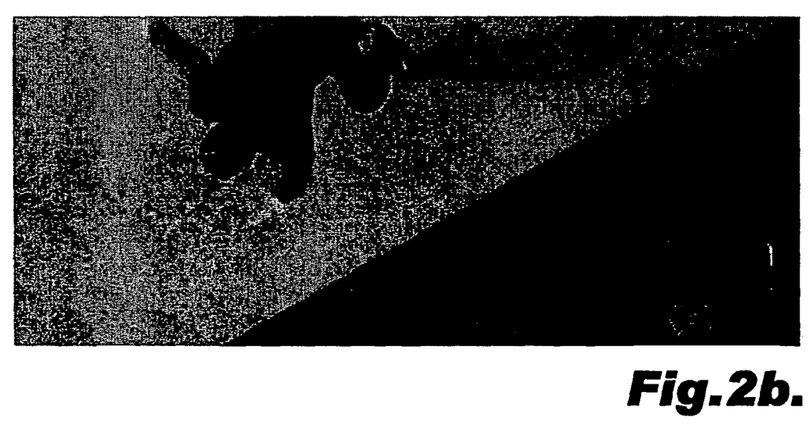
FIG. 2b illustrates a frame image with the HFE enhancements with Amplified Basis functions that add texture back to the frame.

FIG. 2b illustrated a frame image with the HFE enhancements with Amplified Basis functions that add texture back to the frame.

Figure 3A:
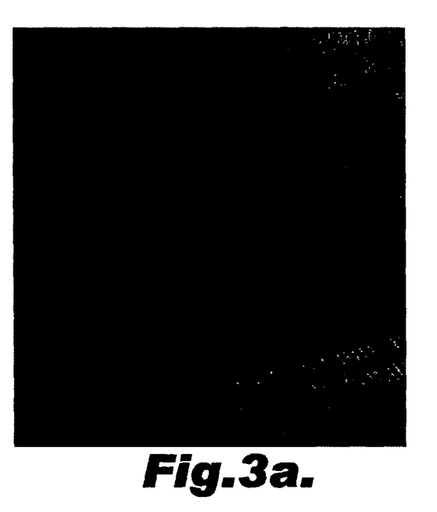
FIG. 3a illustrates a frame image with the HFE enhancements.
Figure 3B:
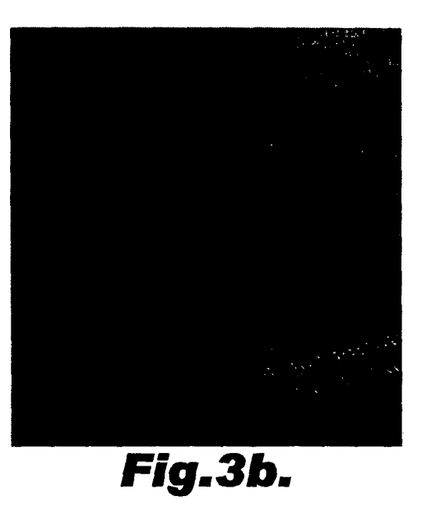
FIG. 3b illustrates a frame image without the HFE enhancements.

As a further example, the HFE enhanced video frame of FIG. 3a has more texture than the unenhanced video frame of FIG. 3b.

I/P Frame HFE

Figure 4A:
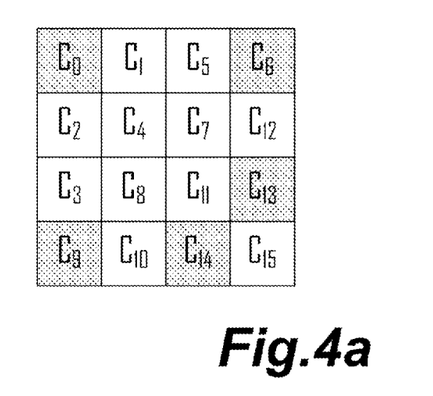
FIG. 4a illustrates a highest frequency determining ZigZag scan practiced in various embodiments.

In various embodiments, a video frame to be decoded with HFE may be an I-Frame or a P-Frame, and the I/P Frame is decoded and enhanced by performing the followings on one or more blocks (e.g. each block) of the I/P Frame:

The highest transmitted coefficient (HC), i.e., highest frequency, of the block is determined. In various embodiments, the transmitted coefficients of the block is analyzed using the ZigZag scan as shown in FIG. 4a.

In various embodiments, coefficients C6, C9, C13, and C14 (shaded boxes) are excluded from consideration, when determining the highest frequency coefficient. The exclusion is motivated by the deblocking filter having a tendency to smooth out the edges of the block and not the center. Resultantly, coefficients C6, C9, C13, and C14 of FIG. 4a have basis functions which mostly effect the center pixels.

In various embodiments, the strength of the correction to be applied is also determined. In some of these embodiments, QP (quantization parameter) is employed to limit its strength. For example, in various embodiment, the strength of the correction may be limited by QP as follows:

0<=QP<9: strength=0
9<=QP<13: strength=1
13<=QP<18: strength=2
18<=QP<32: strength=3

Figure 4B:
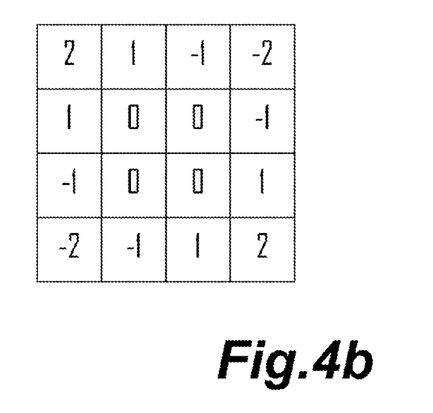
FIG. 4b illustrates an exemplary Basis Function C4 of Strength 2.

In various embodiments, the determined basis functions for a block are added to the corresponding block of an intermediate decoded version of the video frame, in view of the determined HC and the Strength. FIG. 4b illustrates an example Basis Function C4 of Strength 2.

B-Frame HFE

In various embodiments, a video frame to be decoded with HFE may be a B-Frame, and the B-Frame is decoded and enhanced by performing the followings on one or more blocks (e.g. each block) of the B-Frame:

In various embodiments, if the block has any transmitted coefficient, the same HFE scheme as was used with the I/P Frame is used.

In various embodiments, in the case of a Skipped MB, there are no transmitted coefficients. The Skipped MB is reconstructed as the weighted average of temporally co-located blocks. More specifically, the HC and QP for the Skipped MB are determined from the nearest temporally co-located blocks (e.g. adjacent ones).

In various embodiments, HFE also addresses the fact that Video Codecs inherently involves quantizing some frequency coefficients to zero. Further, high frequencies are quantized to zero more often, because a typical video distribution has high energy in low frequencies and lesser energy in high frequencies.

Figure 5A:
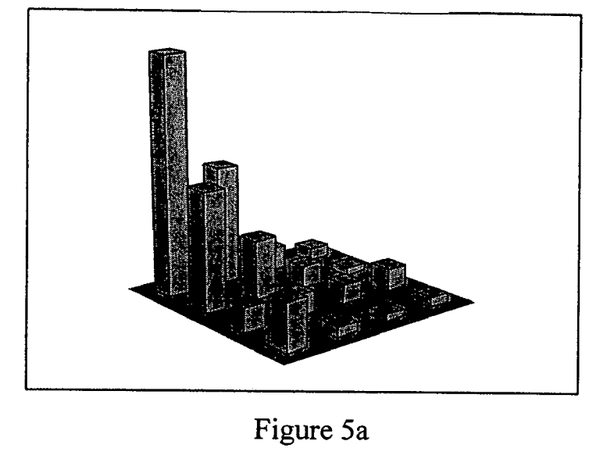
FIGS. 5a-5c illustrate transform coefficients of a video frame before quantization, after dequantization without HFE enhancement, and after dequantization with HFE enhancement.
Figure 5B:
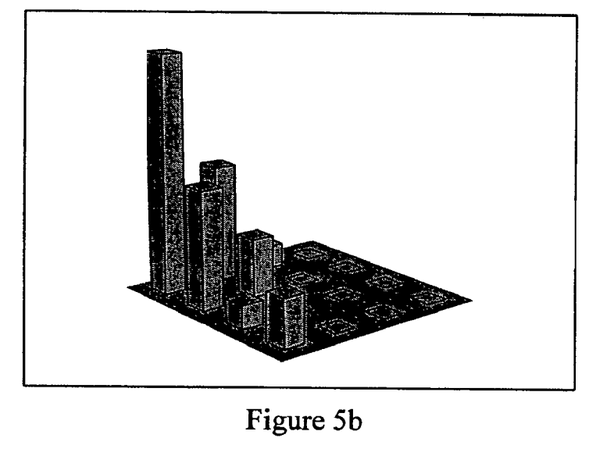
Figure 5C:
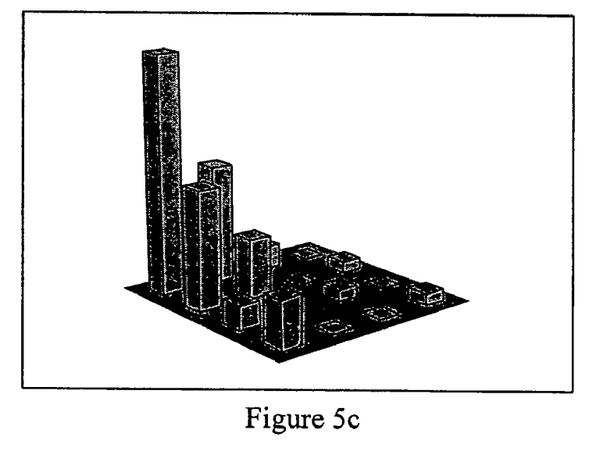

FIGS. 5a-5c illustrate the transform coefficients of an example video frame, the same of a dequantized version of the video frame without HFE, and the same with HFE restoring some or all of the high frequencies quantized to zero.

In various embodiments, HFE restores some or all of the high frequencies quantized to zero as follows;

It inserts High Frequency Coefficients which statistically look similar to the coefficients which are quantized to zero.

In various embodiments, statistics are generated for various contexts in the bitstream, and applied on a context basis. Examples of contexts may include, but are not limited to
1> QP
2> Macroblock Type
3> Last Significant coefficient in a Zig Zag Scan
4> Picture Type
5> Frequencies in the temporally co-located block.

Figure 6A:
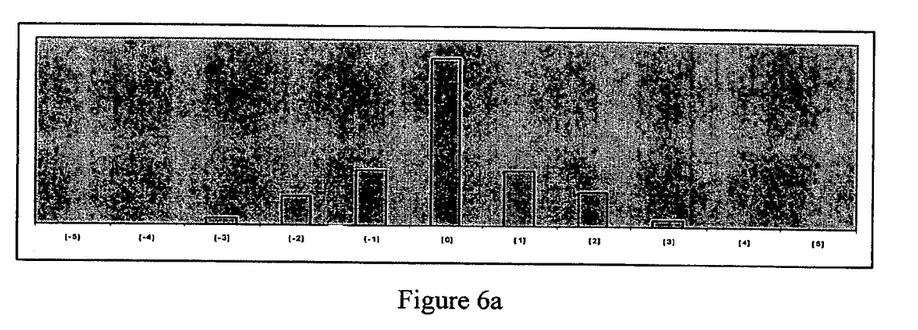
FIGS. 6a-6c illustrate distributions of exemplary statistics employed for HFE, in various embodiments.
Figure 6B:
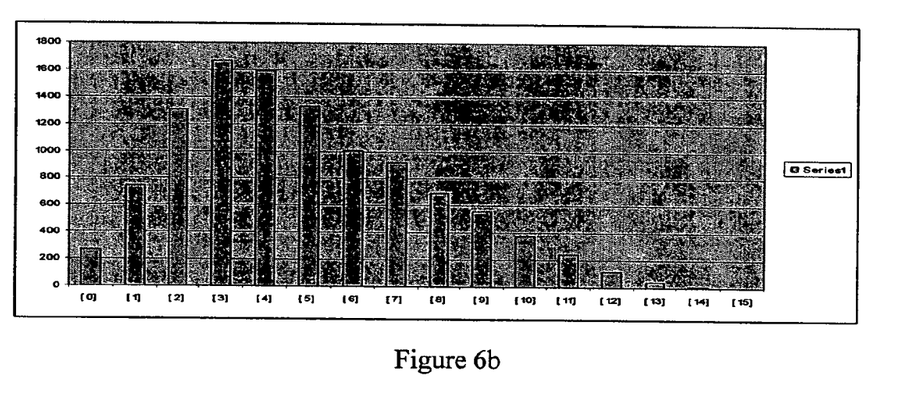
Figure 6C:
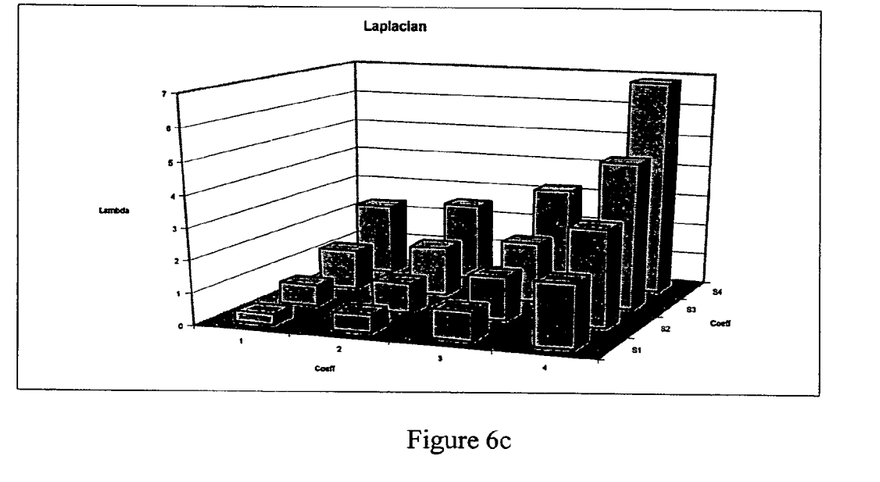

FIGS. 6a-6c illustrate distributions of a number of statistics which may be employed. More specifically, FIG. 6a illustrates a distribution of coefficient levels of Zero Quantized Coeffs, i.e. quantized to zero, whereas FIG. 6b illustrates a distribution of the number of such coefficients quantized to 0 per block. FIG. 6c illustrates distribution of coeff levels quantized to zero of each coefficient represented as Lambda of a ideal Laplacian distribution.

Figure 7A:
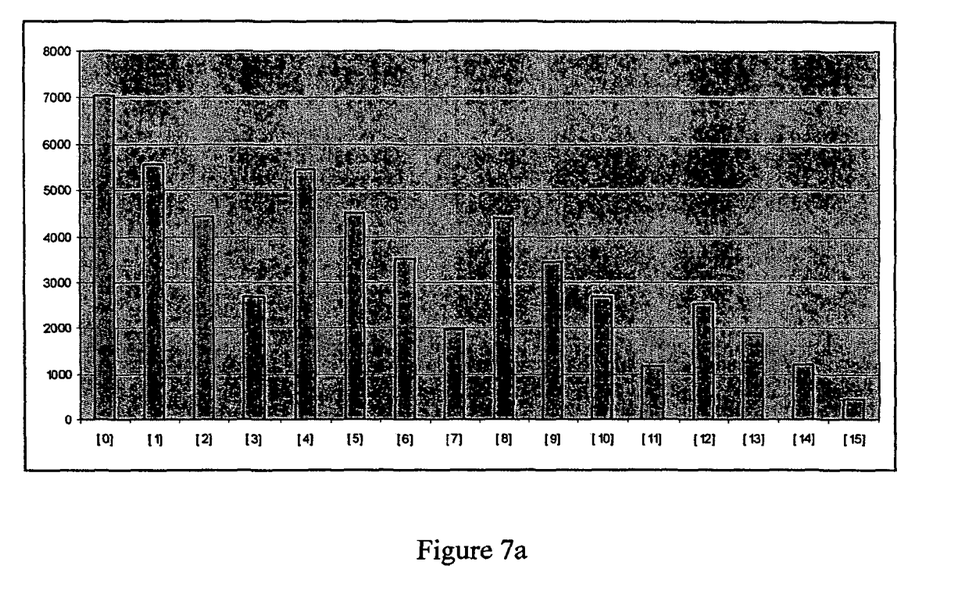
FIGS. 7a-7b illustrate various exemplary statistics determined for an exemplary context, for various embodiments.
Figure 7B:
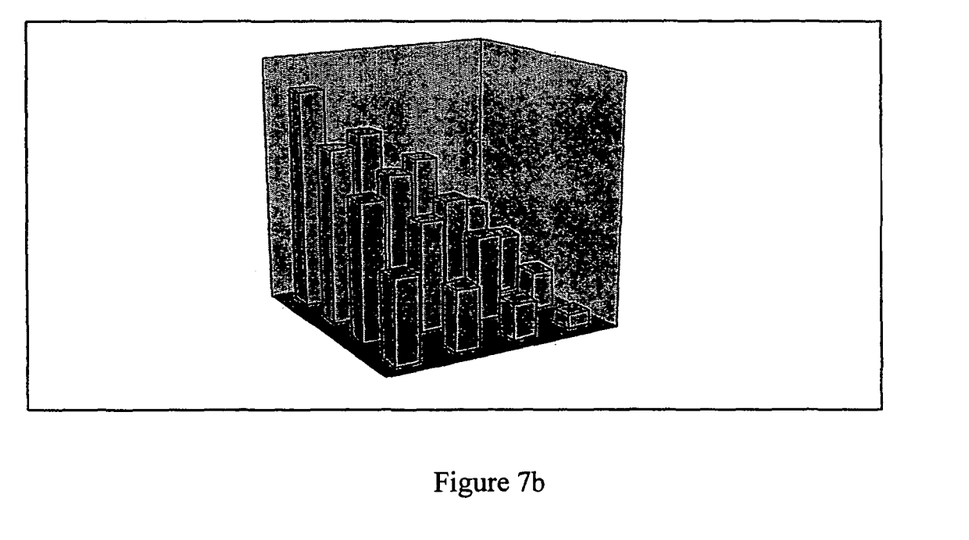

FIGS. 7a-7b illustrate distributions of a number of statistics, which may be employed. More specifically, FIGS. 7a-7b illustrate an Average Distribution of Number of Zero Quantized Coeffs for an exemplary context, which is "given block is not code in an I-Frame", in a 1-D and a 2-D view, respectively.

Depending on implementations, in various embodiments, one or more statistics is maintained for one or more contexts. An example of another context is the context of DC or Low Frequencies Coded in residue of an I-Frame. As those skilled in the art would appreciate, embodiments of the present invention may be practiced with one or more selected statistics for one or more selected contexts.

Results and Applications:

Experience has shown that the use of embodiments of the present invention of HFE with an encoder may increase the average PSNR of the encoder by 0.05 dB and minimum PSNR by 0.15 dB. Since HFE is generally considered to be visually pleasing, stronger HFE schemes may also be practiced in other embodiments. However, the strong HFE schemes may degrade PSNR. [PSNR=Peak Signal-to-Noise Ratio.]

In various embodiments, HFE may be used as a post processing stage for decoders, such as ITU H264 compliant decoders.

Figure 8:
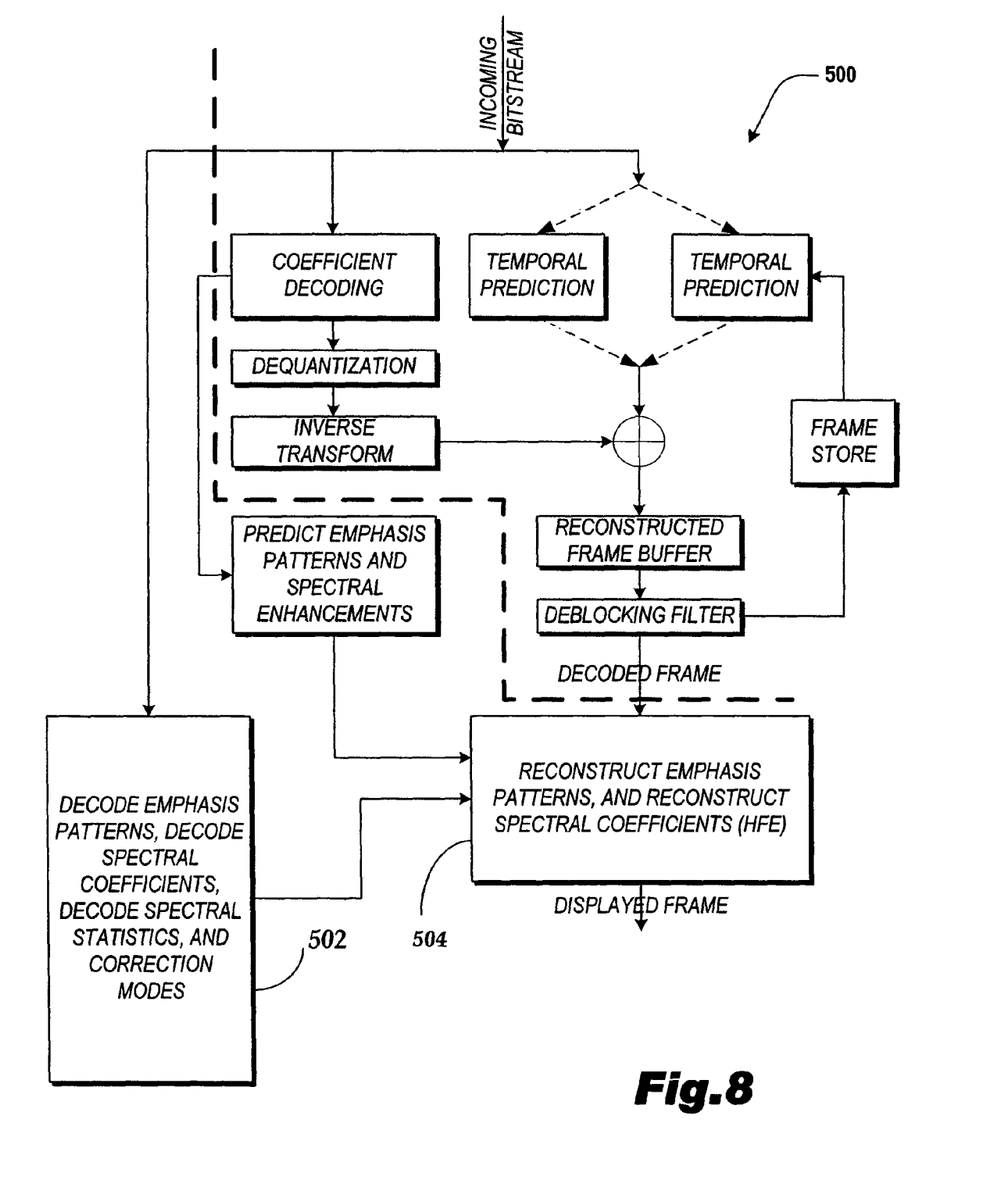
FIG. 8 illustrates a block diagram of an HFE video processing system, in accordance with various embodiments.

A block diagram of one decoder embodiment 500 of the present invention is illustrated in FIG. 8. For the illustrated embodiment, decoder 500 includes similar conventional elements as decoder 100 of FIG. 1, e.g. a dequantization unit, an inverse transformation unit, a deblocking filter unit, and so forth. However, decoder 500 further includes a HFE unit 502 adapted to practice the HFE operations described earlier. Further, reconstruct unit 504 is further adapted to additionally enhance an initially decoded video frame to generate the final decoded video frame in accordance with the HFE specified by HFE unit 502.

While for ease of understanding, HFE and reconstruction units 502-504 are each illustrated as a single unit, in alternate embodiments, their functions may be implemented in one or more units. Further, the various units may be implemented in hardware, using ASIC or reconfigurable IC, or in software, in C or other suitable system programming languages. [ASIC=Application Specific Integrated Circuit]

The term "initially decoded video frame" refers to the input decoded video frame of the reconstruction unit 504, whereas the term "finally decoded video frame" refers the output decoded video frame of the reconstruction unit 504. The input decoded video frame of the reconstruction unit 804 is also referred to as the intermediate decoded video frame.

Experience also has shown that HFE post processing, with or without sideband information, can improve an existing codec. The above system can be used to improve the quality of a given codec without requiring modification to the underlying bitstream. The spectral information can be predicted or coded separately as sideband information.

Embodiments of the present invention could be an effective scheme to improve upon the codec without changing the underlying bitstream.

System

Figure 9:
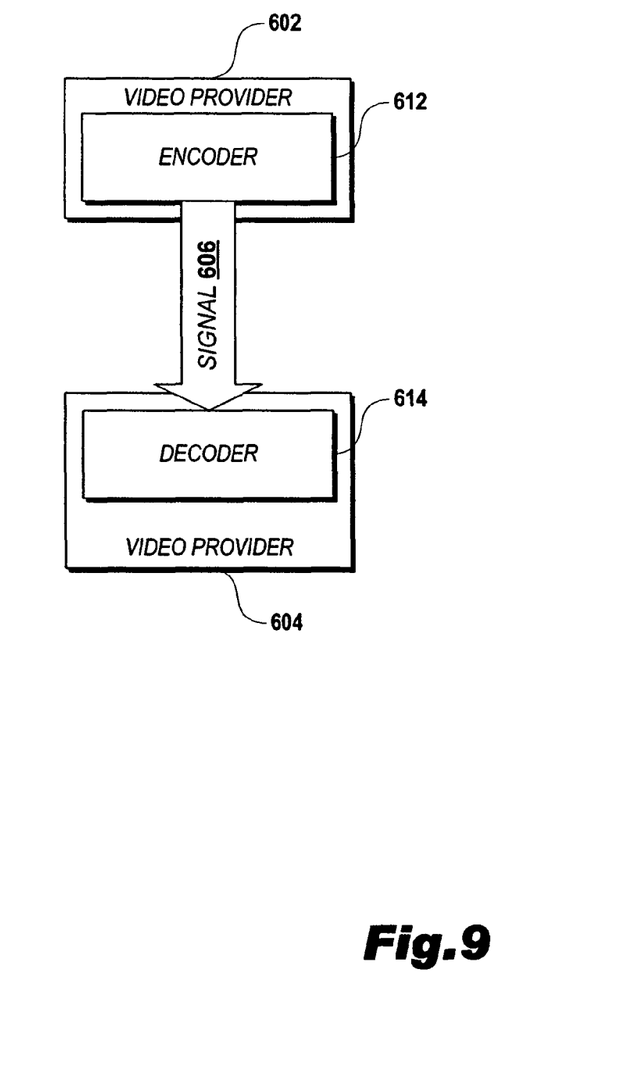
FIG. 9 illustrates an example system having a video sender device and a video receiver device incorporated with teachings of the present invention, in accordance with one embodiment.

FIG. 9 illustrates an overview of an example system incorporated with teachings of the present invention, in accordance with one embodiment. As illustrated, for the embodiment, example system 600 includes video sender 602 and video receiver 604 communicatively coupled to each other as shown. Video sender 602 includes in particular encoder 612, while video receiver 604 includes in particular decoder 614.

Video sender 602 provides an encoded video signal 606 to video receiver 604, using encoder 612 to encode the video. Further, decoder 614 advantageously includes hardware and/or software components incorporated with the HFE teachings of the present invention.

Video receiver 604 receives the encoded video 606, decodes the video using decoder 614 with HFE, and renders the decoded video for consumption by one or more users of video receiver 604. Accordingly, video receiver 604 may also be referred to as a video renderer. For the purpose of the present application, the two terms may be considered interchangeable, unless the context clearly indicates to the contrary.

For the purpose of the present application, as described earlier, a slice of a video is an integer number of macroblocks of a video. A video includes a number of pictures, each including a number of fields or frames, with each field or frame including a number of slices of macroblocks. Each macroblock includes a number of blocks of pixels.

Except for the fact that decoder 614 is advantageously provided with hardware and/or software components adapted to decode video signals with HFE in accordance with an embodiment of the present invention, video server 602, including encoder 612, and video receiver 604 represent a broad range of these elements known in the art or to be designed. Different embodiments may employ different implementations of these elements.

Further, video server 602 and video receiver 604 may be communicatively coupled to each other via any one of a number of wire based and/or wireless connections. For examples, the connection may be a bus connection (such as a Universal Serial Bus connection) or a wired local area network connection (such as an Ethernet connection). As a further example, the connection may also be a combined wireless and wired wide area network connection (such as a TMDA or CDMA wireless connection between video sender 602 or video receiver 604 and a base station at one end, and a wire based ATM connection from the base station to the other end). [TDMA=Time Division Multiple Access, CDMA=Code Division Multiple Access, and ATM=Asynchronous Transfer Mode.]

Example Embodiments Including Decoder 500 of FIG. 8

Figure 10A:
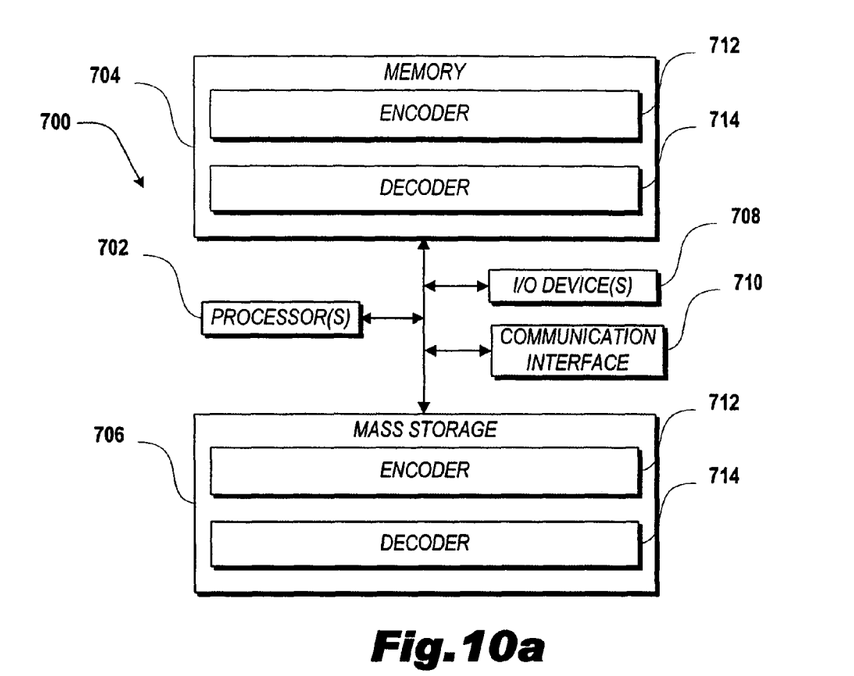
FIGS. 10a-10c illustrate various embodiments of the present invention.
Figures 10B, 10C:
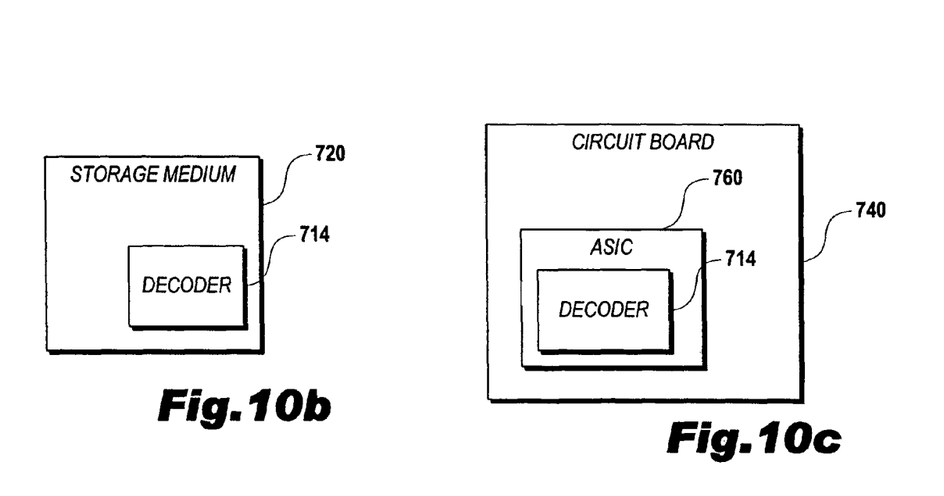

FIGS. 10a-10c illustrate various embodiments incorporated with decoder 500 of FIG. 8. More specifically, FIG. 10a illustrates an example digital system incorporated with a software implementation of encoder 712 and decoder 714 (based on decoder 500 of FIG. 8). For the embodiment, example digital system 700 includes processor 702, memory 704, mass storage 706, I/O devices 708, and communication interface 710 coupled to each other and a (set of bridged) bus(es) as shown.

Memory 704 and mass storage 706 may be employed store a working and a persistent copy of a software implementation of encoder 712 and decoder 714. Except for its usage, memory 704 and mass storage 706 may respectively be any one of a number of storage elements known in the art or to be designed.

Processor 702, I/O devices 708, communication interface 710 and the bus(s) represent a broad range of the respective elements known in the art or to be designed.

In various embodiments, digital system 700 may be a wireless mobile phone, a personal digital assistant, a palm-sized computing device, a laptop computing device, a tablet computing device, a desktop computing device, a set top box, a server, an entertainment unit, a DVD player, a digital camera, a television, a display monitor, and other computing devices of the like.

FIG. 10b illustrates an article of manufacture having storage medium 720 and a software implementation of decoder 714 stored therein. Stored decoder 714 may be employed to program and enable an apparatus to decode encoded video with HFE as earlier described. The apparatus may e.g. be digital system 700 of FIG. 10a.

In various embodiments, article 720 may e.g. be a diskette, a compact disk (CD), a DVD (digital versatile disk) or other computer readable medium of the like. In other embodiments, article 720 may be a distribution server distributing encoder 712 and/or decoder 714 on line, via private and/or public networks, such as the Internet. In one embodiment, article 720 is a web server.

FIG. 10c illustrates a circuit board embodiment, where circuit board 740 includes an ASIC 760 having a number of hardware implementations of a decoding unit. ASIC 760 may be employed to form e.g. a DVD player, a digital camera, an entertainment unit, a set-top box and so forth.

In alternate embodiments, the decoding units may be disposed in multiple ASICs 760 instead.

Alternate Embodiments

While the present invention has been described with the above illustrative embodiments, including the example video system of FIG. 9, and various embodiments of the video decoder of FIGS. 10a-10c. The invention is not so limited. It may be modified and/or enhanced consistent with the scope of the invention defined by the claims to follow.

What is claimed:

1. A method of generating an estimation of high-frequency information lost from an encoded block of an original image block, the method comprising:

obtaining, via an acquisition processor, the encoded block of the original image block;

initially decoding, via an enhancement processor, the encoded block into an initially-decoded block of the video frame, said initially-decoded block comprising a first plurality of transform coefficients including a set of zero-valued high-frequency transform coefficients that lost a set of non-zero values due to quantization of the original image block;

predicting, via said enhancement processor, a high-frequency basis function according to at least some of said first plurality of transform coefficients, said high-frequency basis function including a plurality of predicted high-frequency non-zero coefficients that are not present in either of the encoded block or said initially-decoded block, wherein said predicted high-frequency non-zero coefficients are statistically similar to said set of non-zero values; and inserting, via said enhancement processor, said high-frequency basis function into said initially-decoded block to form a finally-decoded high-frequency-enhanced output block including said plurality of predicted high-frequency non-zero coefficients.

2. The method of claim 1, wherein the obtaining comprises receiving the encoded version of the video frame as a part of a bit stream.

3. The method of claim 1, wherein said high-frequency basis function is predicted based at least in part on an amount of transmitted coefficients for the encoded block.

4. The method of claim 1, wherein said high-frequency basis function comprises a plurality of high frequency basis functions predicted based at least in part on a determined highest transmitted coefficient for the block type of the original image block.

5. The method of claim 4, wherein the determining of a highest transmitted coefficient for the block comprises excluding one or more transmitted coefficients of the encoded block from consideration.

6. The method of claim 4, wherein the method further comprises calculating an application strength for the high-frequency basis function, based at least in part on a quantization parameter of the original image block; and predicting said high-frequency basis function is further based on the calculation of an application strength for the block.

7. The method of claim 4, wherein the original image block is from an I-frame or the original image block is from a P-frame.

8. The method of claim 4, wherein the encoded block is from a B-frame, and the original image block comprises transmitted coefficients not quantized to zero.

9. The method of claim 4, wherein the encoded block is from a B-frame; the encoded block is a skipped macroblock of the B-frame with no transmitted coefficients; and the method further comprises predicting transmitted coefficients for the skipped macroblock, based on one or more temporally co-located blocks of a B-frame.

10. A decoder for generating an estimation of high-frequency information lost from an encoded block of an original image block, the decoder comprising:
   means for obtaining the encoded block of an original image block;
   means for initially decoding the encoded block into an initially-decoded block of the video frame, said initially-decoded block comprising a first plurality of transform coefficients including a set of zero-valued high-frequency transform coefficients that lost a set of non-zero values due to quantization of the original image block;
   means for predicting a high-frequency basis function according to at least some of said first plurality of transform coefficients, said high-frequency basis function including a plurality of predicted high-frequency non-zero coefficients that are not present in either of the encoded block or said initially-decoded block, wherein said predicted high-frequency non-zero coefficients are statistically similar to said set of non-zero values; and
   means for inserting said high-frequency basis function into said initially-decoded block to form a finally-decoded high-frequency-enhanced output block including said plurality of predicted high-frequency non-zero coefficients.

11. The decoder of claim 10, wherein the means for obtaining is adapted to exclude one or more transmitted coefficients for an encoded block from consideration, when determining a highest transmitted coefficient for the block.

12. The decoder of claim 10, wherein the means for predicting is adapted to determine an application strength for the high-frequency basis function, based at least in part on a quantization parameter of the original image block.

13. The decoder of claim 10, further comprising means for predicting transmitted coefficients for a skipped macroblock of the encoded block of the video frame, based on one or more temporally co-located blocks of the encoded block of the video frame, when the video frame is a B-frame without transmitted coefficients.

14. The decoder of claim 10, wherein the means comprise storage medium having instructions adapted to implement the means, and at least one processor coupled to the storage medium to execute the instructions.

15. A system for generating an estimation of high-frequency information lost from an encoded block of an original image block comprising:
   a receiver adapted to receive an encoded version of a video frame; and
   a decoder coupled to the receiver, and adapted to
      obtain the encoded block of an original image block;
      initially decode the encoded block into an initially-decoded block of the video frame, said initially-decoded block comprising a first plurality of transform coefficients including a set of zero-valued high-frequency transform coefficients that lost a set of non-zero values due to quantization of the original image block;
      predict a high-frequency basis function according to at least some of said first plurality of transform coefficients, said high-frequency basis function including a plurality of predicted high-frequency non-zero coefficients that are not present in either of the encoded block or said initially-decoded block, wherein said predicted high-frequency non-zero coefficients are statistically similar to said set of non-zero values; and
      insert said high-frequency basis function into said initially-decoded block to form a finally-decoded high-frequency-enhanced output block including said plurality of predicted high-frequency non-zero coefficients.

16. The system of claim 15, wherein the decoder is adapted to exclude one or more transmitted coefficients of the encoded block from consideration.

17. The system of claim 15, wherein the decoder is adapted to determine an application strength for the high-frequency basis function, based at least in part on a quantization parameter of the original image block.

18. The system of claim 15, wherein the decoder is further adapted to predict transmitted coefficients for a skipped macroblock of the encoded block of the video frame, based on one or more temporally co-located blocks of the encoded block of the video frame, when the video frame is a B-frame without transmitted coefficients.

19. The system of claim 15, wherein the system is a selected one from the group consisting of a palm sized computing device, a wireless mobile phone, a digital personal assistant, a set-top box, a digital versatile disk player, a television, and a display monitor.

* * * * *